US010426263B1

(12) United States Patent
Whaley (10) Patent No.: US 10,426,263 B1
(45) Date of Patent: Oct. 1, 2019

(54) KITCHEN UTENSIL SUSPENSION ASSEMBLY

(71) Applicant: John Whaley, Rockwell, NC (US)

(72) Inventor: John Whaley, Rockwell, NC (US)

(*) Notice: Subject to any disclaimer, the term of this patent is extended or adjusted under 35 U.S.C. 154(b) by 0 days.

(21) Appl. No.: 16/176,504

(22) Filed: Oct. 31, 2018

(51) Int. Cl.
| | |
|---|---|
| *A47B 77/10* | (2006.01) |
| *A47B 46/00* | (2006.01) |
| *A47J 45/02* | (2006.01) |
| *A47B 77/14* | (2006.01) |
| *A47B 77/08* | (2006.01) |

(52) U.S. Cl.
CPC ............ *A47B 77/10* (2013.01); *A47B 46/005* (2013.01); *A47B 77/08* (2013.01); *A47B 77/14* (2013.01); *A47J 45/02* (2013.01)

(58) Field of Classification Search
CPC ......... A47B 77/10; A47B 77/08; A47B 77/14; A47B 46/005; A47J 45/02; A47J 47/16
See application file for complete search history.

(56) References Cited

U.S. PATENT DOCUMENTS

| | | | | |
|---|---|---|---|---|
| 62,159 | A * | 2/1867 | Sickels | A47G 25/0685 211/99 |
| 426,313 | A * | 4/1890 | Paxson | A47G 25/0685 211/99 |
| 1,787,587 | A | 1/1931 | Miller | |
| D136,015 | S * | 7/1943 | Luger | D32/58 |
| 2,582,320 | A * | 1/1952 | Evans | A47G 25/02 211/104 |
| 3,233,852 | A * | 2/1966 | Azar | A47B 96/027 248/243 |
| 4,290,531 | A | 9/1981 | Lazarus, III | |
| 4,702,176 | A * | 10/1987 | Goshow | A47B 23/025 108/49 |
| 4,717,166 | A | 1/1988 | Vachon | |
| 5,019,126 | A * | 5/1991 | Post | A47G 25/0685 211/100 |
| 5,238,127 | A | 8/1993 | Geller | |
| D518,669 | S | 4/2006 | Raforth | |
| 8,333,158 | B2 * | 12/2012 | Wise | A47B 46/005 108/108 |
| 8,517,186 | B1 * | 8/2013 | McCoy | H02G 3/263 211/193 |
| 8,800,188 | B1 * | 8/2014 | Fishelis | A47B 43/006 40/711 |
| 9,144,349 | B2 | 9/2015 | Groll | |
| 9,289,065 | B1 * | 3/2016 | Lambertson | A47B 96/027 |

(Continued)

*Primary Examiner* — Ko H Chan (57) ABSTRACT

A kitchen utensil suspension assembly for storing kitchen utensils over a kitchen sink includes a pair of brackets that is each of the brackets coupled to a vertical support surface. The brackets are spaced apart from each other a distance corresponding to a width of a kitchen sink. A plurality of supports is each pivotally coupled to a respective one of the brackets. Each of the supports is positionable in a deployed position having each of the supports being oriented at an angle with respect to the vertical support surface. Additionally, each of the supports is positionable in a stored position having each of the supports extending upwardly along the vertical support surface. A plurality of poles is each extended through each of the first and second supports. Thus, each of the poles may have a kitchen utensil suspended thereon for storage.

7 Claims, 5 Drawing Sheets

(56) References Cited

U.S. PATENT DOCUMENTS

| | | | |
|---|---|---|---|
| 2002/0033436 A1* | 3/2002 | Peng | F16M 11/10 |
| | | | 248/284.1 |
| 2005/0135103 A1* | 6/2005 | Evans | F21S 8/035 |
| | | | 362/276 |
| 2009/0173703 A1 | 7/2009 | Einbinder | |
| 2009/0223912 A1* | 9/2009 | Chen | A47B 47/0091 |
| | | | 211/48 |

* cited by examiner

KITCHEN UTENSIL SUSPENSION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to suspension devices and more particularly pertains to a new suspension device for storing kitchen utensils over a kitchen sink 15.

BRIEF SUMMARY OF THE INVENTION

An embodiment of the disclosure meets the needs presented above by generally comprising a pair of brackets that is each of the brackets coupled to a vertical support surface. The brackets are spaced apart from each other a distance corresponding to a width of a kitchen sink. A plurality of supports is each pivotally coupled to a respective one of the brackets. Each of the supports is positionable in a deployed position having each of the supports being oriented at an angle with respect to the vertical support surface. Additionally, each of the supports is positionable in a stored position having each of the supports extending upwardly along the vertical support surface. A plurality of poles is each extended through each of the first and second supports. Thus, each of the poles may have a kitchen utensil suspended thereon for storage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new suspension device embodying the principles and concepts of an embodiment of the disclosure and generally designated by the reference numeral 10 will be described.

As best illustrated in FIGS. 1 through 6, the kitchen utensil suspension assembly 10 generally comprises a pair of brackets 12 that is each coupled to a vertical support surface 14. The vertical support surface 14 may be a wall in a kitchen and the brackets 12 are spaced apart from each other a distance corresponding to a width of a kitchen sink 15. Additionally, each of the brackets 12 is positioned between wall cabinets that are each positioned on opposite sides of the kitchen sink 15.

Each of the brackets 12 has a central panel 16 extending between a pair of outward panels 18, and the central panel 16 of each of the brackets 12 has a plurality of fastener apertures 20 extending therethrough. The central panel 16 abuts the vertical support surface 14 having each of the outward panels 18 extending away from the vertical support surface 14. Additionally, each of the fastener apertures 20 has a fastener extending therethrough and engaging the vertical support surface 14. The fastener may be a screw or the like and the pair of brackets 12 includes a first bracket 19 and a second bracket 21.

A plurality of supports 22 is included and each of the supports 22 is pivotally coupled to a respective one of the brackets 12. Each of the supports 22 is positionable in a deployed position having each of the supports 22 being oriented at an angle with respect to the vertical support surface 14. Additionally, each of the supports 22 is positionable in a stored position having each of the supports 22 extending upwardly along the vertical support surface 14.

Each of the supports 22 has a first end 24 and a second end 26, and each of the supports 22 is elongated between the first 24 and second 26 ends. The plurality of supports 22 includes a set of first supports 28 and a set of second supports 30. The first end 24 of each of the first supports 28 is pivotally coupled to a respective one of the outward panels 18 of the first bracket 19. Additionally, the first end 24 of each of the second supports 30 is pivotally coupled to a respective one of the outward panels 18 of the second bracket 21.

A plurality of poles 32 is provided and each of the poles 32 extends through each of the first 28 and second 30 supports. Thus, each of the poles 32 may have a kitchen utensil 33, such as a pot or a pan, suspended thereon for storage. The poles 32 are spaced apart from each other and are distributed between the first 24 and second 26 ends of the first 28 and second 30 supports. Each of the poles 32 has a length that is greater than the spacing between the brackets 12. Thus, each of the poles 32 extends outwardly beyond the first 20 and second 30 sets of supports.

A pair of first supporting rods 34 is provided and each of the first supporting rods 34 is selectively coupled between the brackets 12 and the supports 22. Each of the first supporting rods 34 has a primary end 36 and a secondary end 38. The primary end 36 of each of the first supporting rods 34 engages a respective one of the outward panels 18 of a respective one of the brackets 12. Additionally, the secondary end 38 of each of the first supporting rods 34 engages a respective one of the first 28 and second 30 supports such that each of the first 28 and second 30 supports is horizontally oriented.

A pair of second supporting rods 40 is provided and each of the second supporting rods 40 is selectively coupled between the brackets 12 and the supports 22. Additionally, each of the second supporting rods 40 has a length is less than a length of the first supporting rods 34. Each of the second supporting rods 40 has a primary end 42 and a secondary end 44. The primary end 42 of each of the second supporting rods 40 engages a respective one of the outward panels 18 of a respective one of the brackets 12. Moreover, the secondary end 44 of each of the second supporting rods 40 engages a respective one of the first 28 and second 30 supports such that each of the first 28 and second 30 supports is positioned at an upward angle on the brackets 12. In this way headroom for a user is increased beneath the first 28 and second 30 supports when the second supporting rods 40 are employed in lieu of the first supporting rods 34.

Each of the first 34 and second 40 supporting rods has a first bend 46 thereon that is spaced from the primary end 36 of the first 38 and second 40 supporting rods. A respective one of the outward panels 18 of each of the brackets 12 has a first supporting aperture 48 extending therethrough, and the first supporting aperture 48 in each of the brackets 12 insertably receives the first end 24 of the first 38 or second 40 supporting rods. A respective one each of the first 18 and second 22 sets of supports has a second supporting aperture 50 extending therethrough. Each of the first and second supporting rods 40 has a sequence of second bends 52 thereon that are spaced from the secondary end 38 of the first 38 and second 40 supporting rods. The second supporting aperture 50 in each of the first 28 and second 30 supports insertably receives the secondary end 38 of the first 38 or second 40 supporting rods.

Figure 1:
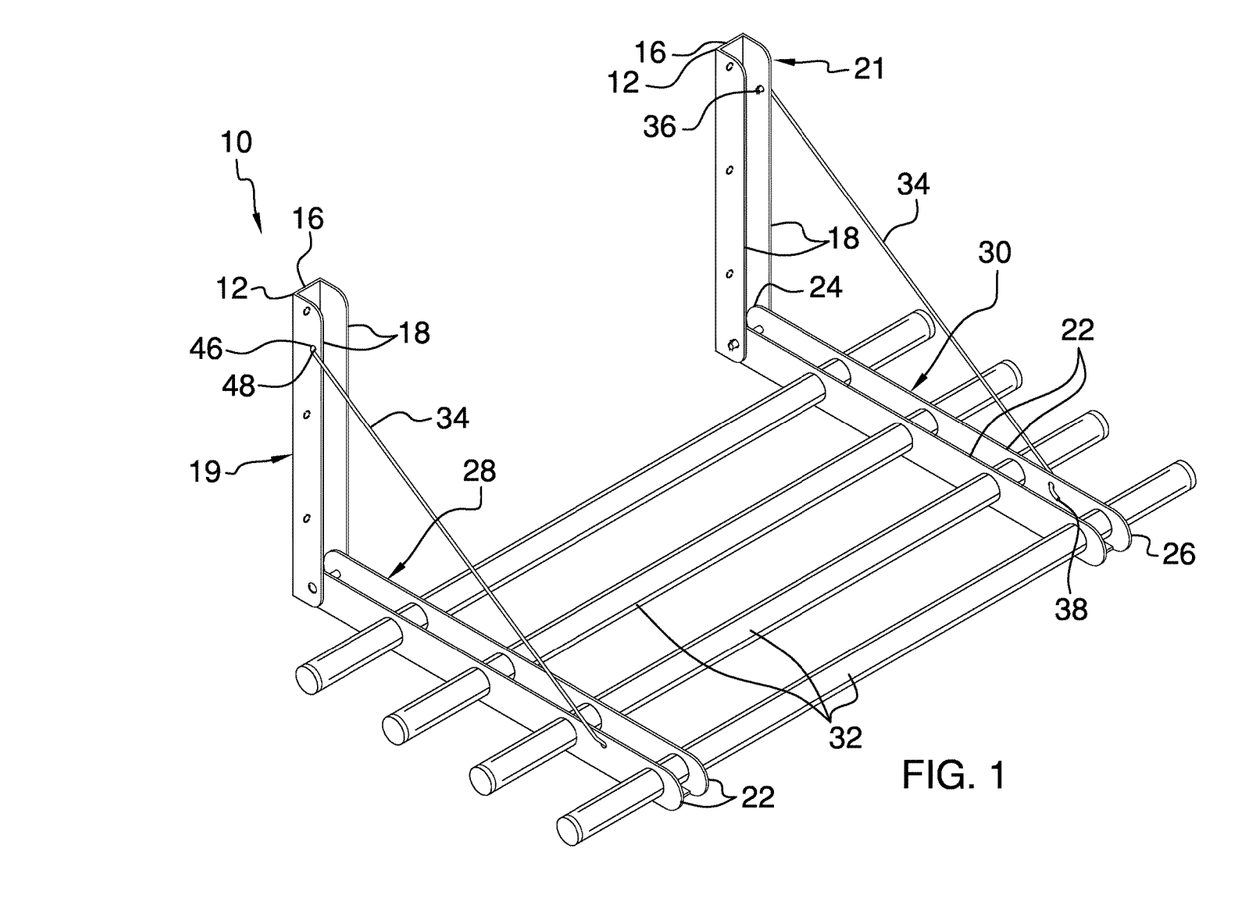
FIG. 1 is a front perspective view of a kitchen utensil suspension assembly according to an embodiment of the disclosure.
Figure 2:
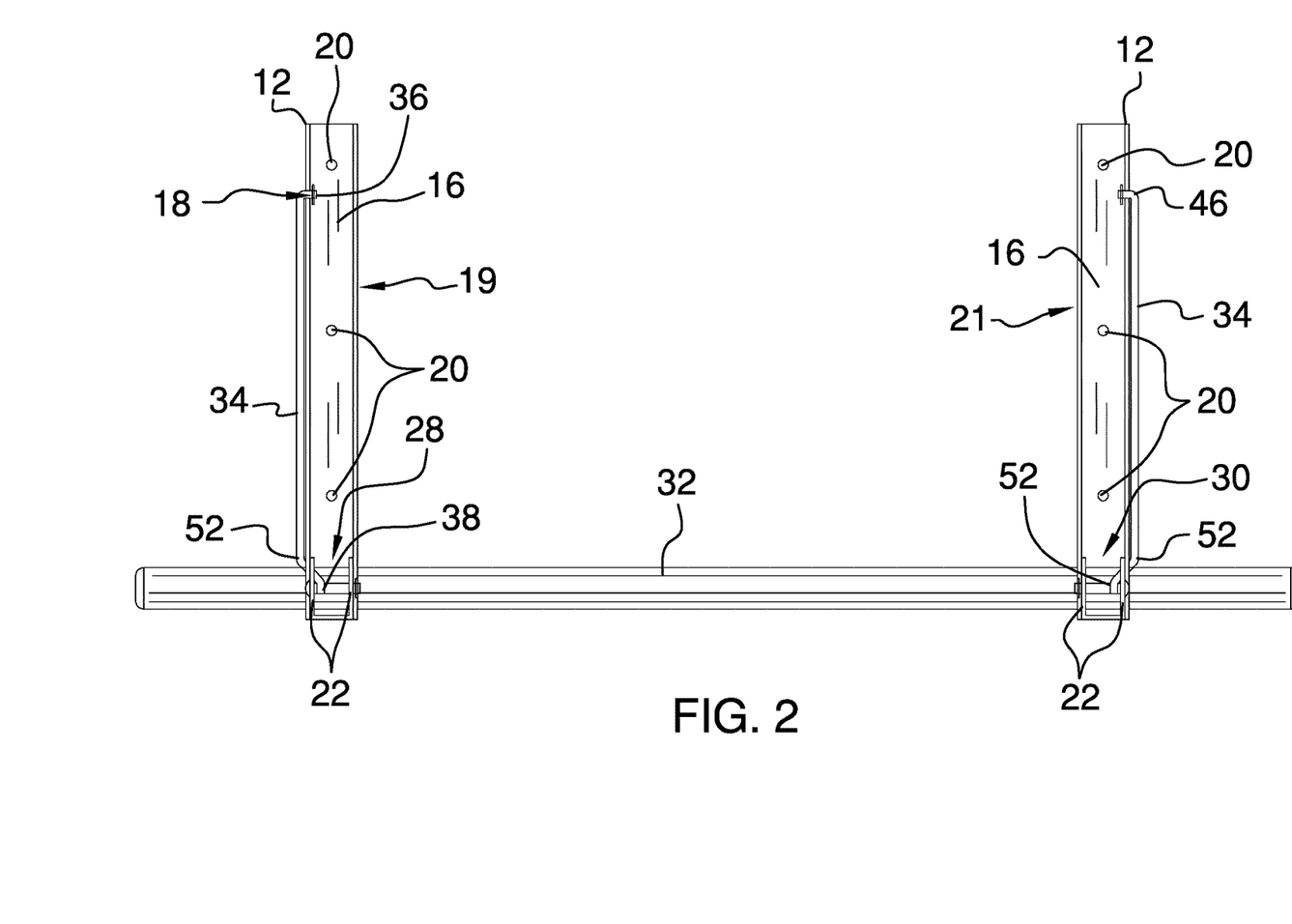
FIG. 2 is a front view of an embodiment of the disclosure.
Figure 3:
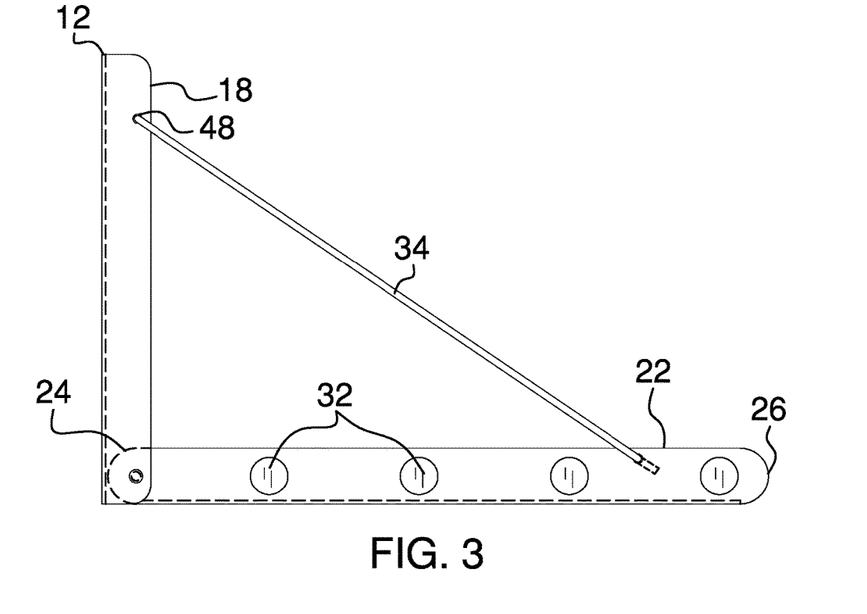
FIG. 3 is a right side view of an embodiment of the disclosure showing a first supporting rod being employed.
Figure 4:
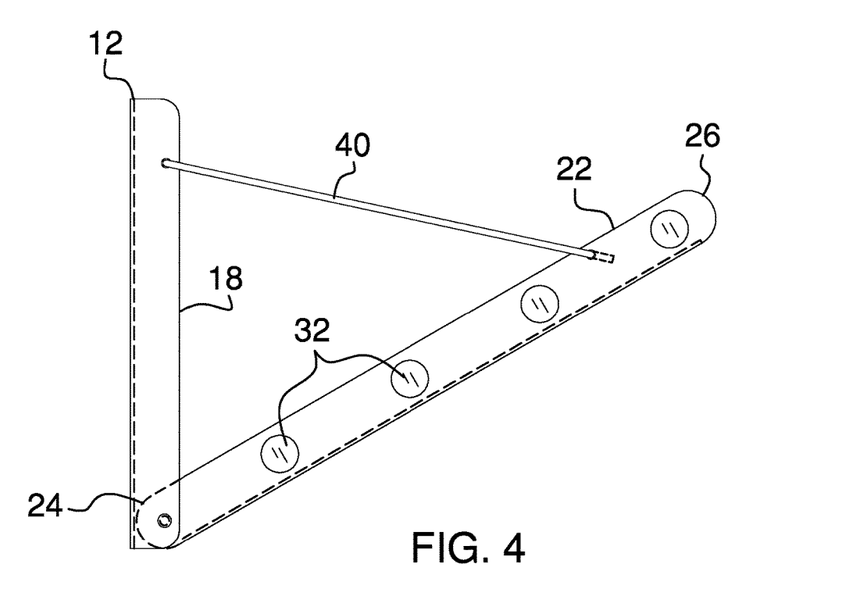
FIG. 4 is a right side view of an embodiment of the disclosure showing a second supporting rod being employed.
Figure 5:
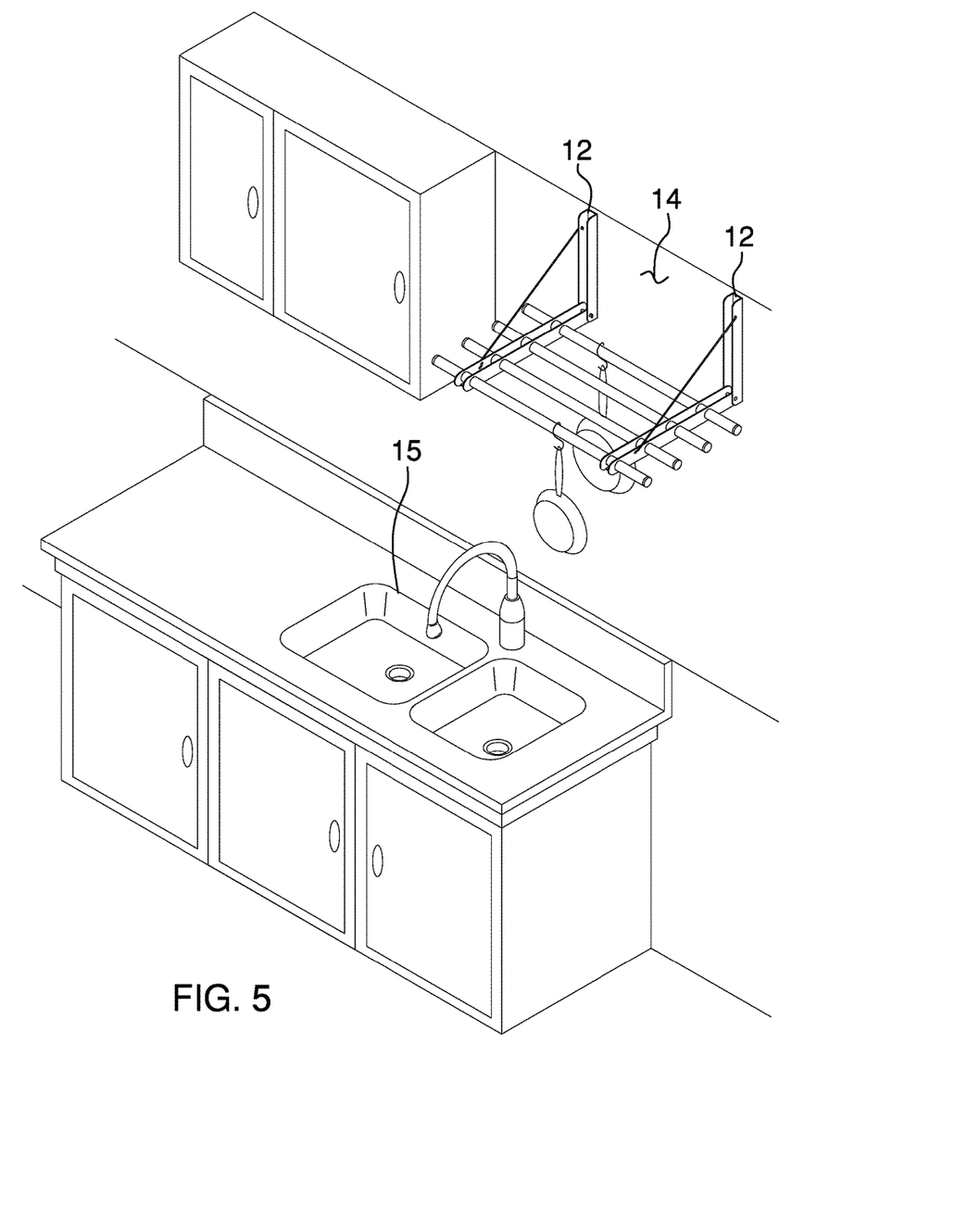
FIG. 5 is a perspective in-use view of an embodiment of the disclosure.
Figure 6:
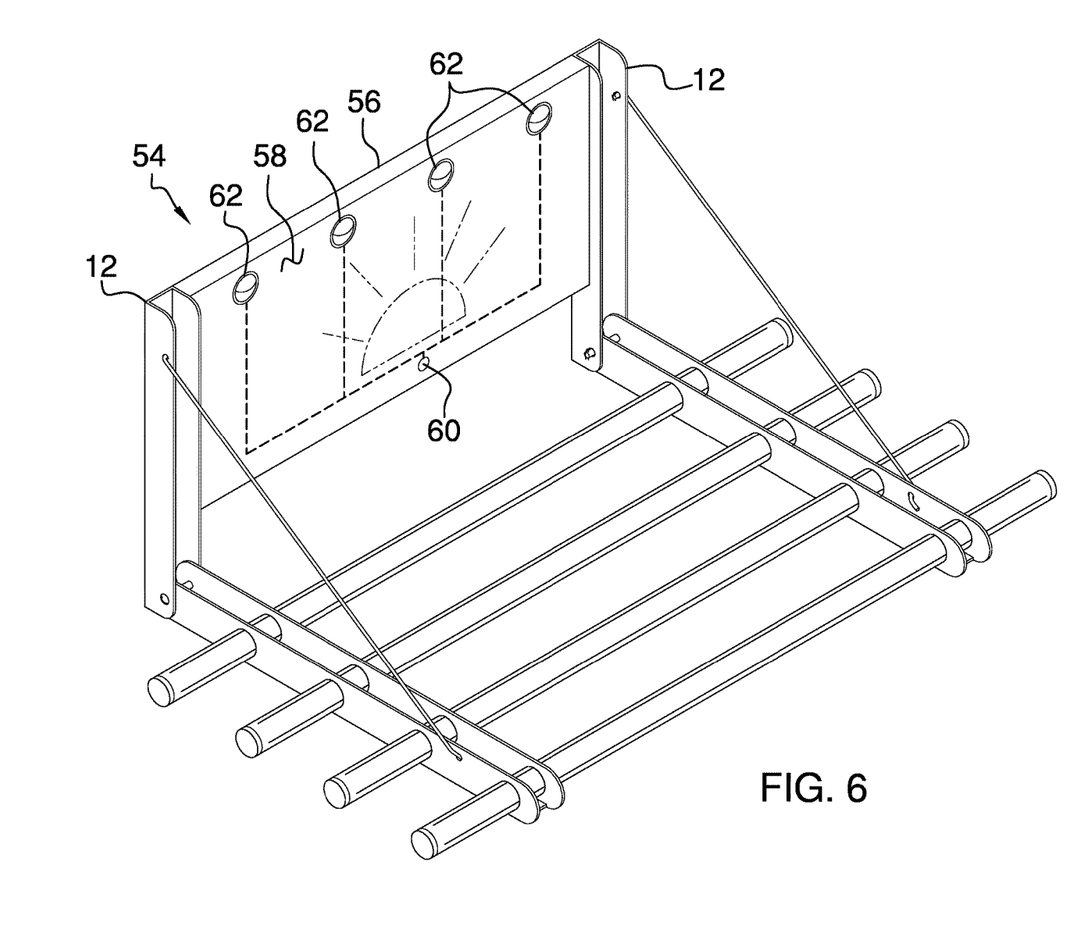
FIG. 6 is a perspective view of an alternative embodiment of the disclosure.

In an alternative embodiment 54 as shown in FIG. 6, a panel 56 is coupled between each of the brackets 12 and the panel 56 has a forwardly facing surface 58. A motion sensor 60 is coupled to the forwardly facing surface 58 of the panel 56 for sensing motion within a trigger distance of the panel 56. The motion sensor 60 may be an electronic motion sensor of any conventional design. Continuing in the alternative embodiment 54, a plurality of light emitters 62 is each coupled to the forwardly facing surface 58 of the panel 56 for emitting light outwardly therefrom. Each of the light emitters 62 is electrically coupled to the motion sensor 60 and each of the light emitters 62 is turned on when the motion sensor 60 senses motion. Each of the light emitters 62 is electrically coupled to a power source such as electrical wiring in the kitchen or the like and each of the light emitters 62 may comprise an LED or the like.

In use, each of the brackets 12 is mounted to the vertical support surface 14 such that each of the brackets 12 is positioned above the kitchen sink 15. Each of the first supporting rods 34 is coupled between the brackets 12 and a respective one of the first 28 and second 30 supports. Thus, the first 28 and second 30 supports are retained at a right angle with respect to the brackets 12. In this way each of the poles 32 may have kitchen utensils 34 suspended thereon for storage above the kitchen sink 15. Thus, the otherwise unused spaced above the kitchen sink 15 can be employed for storage. Each of the second supporting rods 40 is coupled between the brackets 12 and a respective one of the first 28 and second 30 supports when increased head room is required with respect to the first supporting rods 34. In this way the first 28 and second 30 supports are retained at an upward angle with respect to the brackets 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A kitchen utensil suspension assembly being configured to suspend pots and pans in a kitchen, said assembly comprising:
   a pair of brackets, each of said brackets being coupled to a vertical support surface, said brackets being spaced apart from each other;
   a plurality of supports, each of said supports being pivotally coupled to a respective one of said brackets, each of said supports being positionable in a deployed position having each of said supports being oriented at an angle with respect to the vertical support surface, each of said supports being positionable in a stored position having each of said supports extending upwardly along the vertical support surface; and
   a plurality of poles, each of said poles extending through each of said first and second supports wherein each of said poles is configured to have a kitchen utensil suspended thereon for storage;
   a panel being coupled between each of said brackets, said panel having a forwardly facing surface;

a motion sensor being coupled to said forwardly facing surface of said panel wherein said motion sensor is configured to detect motion within a trigger distance of said panel; and a light emitter, said light emitter being coupled to said forwardly facing surface of said panel wherein said light emitter is configured to emit light outwardly therefrom, said light emitter being electrically coupled to said motion sensor, said light emitter being turned on when said motion sensor senses motion.

2. The assembly according to claim 1, wherein each of said brackets has a central panel extending between a pair of outward panels, said central panel of each of said brackets having a plurality of fastener apertures extending therethrough, said central panel abutting the vertical support surface having each of said outward panels extending away from the vertical support surface, each of said fastener apertures having a fastener extending therethrough and engaging the vertical support surface, said pair of brackets including a first bracket and a second bracket.

3. The assembly according to claim 2, wherein:
each of said supports has a first end and a second end, each of said supports being elongated between said first and second ends;
said plurality of supports includes a set of first supports and a set of second supports;
said first end of each of said first supports being pivotally coupled to a respective one of said outward panels of said first bracket; and
said first end of each of said second supports being pivotally coupled to a respective one of said outward panels of said second bracket.

4. The assembly according to claim 3, wherein said poles are spaced apart from each other and are distributed between said first and second ends of said first and second supports.

5. The assembly according to claim 3, further comprising:
a pair of first supporting rods, each of said first supporting rods being selectively coupled between said brackets and said supports each of said first supporting rods having a primary end and a secondary end;
said primary end of each of said first supporting rods engaging a respective one of said outward panels of a respective one of said brackets; and
said secondary end of each of said first supporting rods engaging a respective one of said first and second supports such that each of said first and second supports is horizontally oriented.

6. The assembly according to claim 5, further comprising:
a pair of second supporting rods, each of said second supporting rods being selectively coupled between said brackets and said supports, each of said second supporting rods having a length being less than a length of said first supporting rods, each of said second supporting rods having a primary end and a secondary end;
said primary end of each of said second supporting rods engaging a respective one of said outward panels of a respective one of said brackets; and
said secondary end of each of said first supporting rods engaging a respective one of said first and second supports such that each of said first and second supports is positioned at an upward angle on said brackets.

7. A kitchen utensil suspension assembly being configured to suspend pots and pans in a kitchen, said assembly comprising:
a pair of brackets, each of said brackets being coupled to a vertical support surface, said brackets being spaced apart from each other, each of said brackets having a central panel extending between a pair of outward panels, said central panel of each of said brackets having a plurality of fastener apertures extending therethrough, said central panel abutting the vertical support surface having each of said outward panels extending away from the vertical support surface, each of said fastener apertures having a fastener extending therethrough and engaging the vertical support surface, said pair of brackets including a first bracket and a second bracket;

a plurality of supports, each of said supports being pivotally coupled to a respective one of said brackets, each of said supports being positionable in a deployed position having each of said supports being oriented at an angle with respect to the vertical support surface, each of said supports being positionable in a stored position having each of said supports extending upwardly along the vertical support surface, each of said supports having a first end and a second end, each of said supports being elongated between said first and second ends, said plurality of supports including a set of first supports and a set of second supports, said first end of each of said first supports being pivotally coupled to a respective one of said outward panels of said first bracket, said first end of each of said second supports being pivotally coupled to a respective one of said outward panels of said second bracket;

a plurality of poles, each of said poles extending through each of said first and second supports wherein each of said poles is configured to have a kitchen utensil suspended thereon for storage, said poles being spaced apart from each other and being distributed between said first and second ends of said first and second supports;

a pair of first supporting rods, each of said first supporting rods being selectively coupled between said brackets and said supports, each of said first supporting rods having a primary end and a secondary end, said primary end of each of said first supporting rods engaging a respective one of said outward panels of a respective one of said brackets, said secondary end of each of said first supporting rods engaging a respective one of said first and second supports such that each of said first and second supports is horizontally oriented; and a pair of second supporting rods, each of said second supporting rods being selectively coupled between said brackets and said supports, each of said second supporting rods having a length being less than a length of said first supporting rods, each of said second supporting rods having a primary end and a secondary end, said primary end of each of said second supporting rods engaging a respective one of said outward panels of a respective one of said brackets, said secondary end of each of said first supporting rods engaging a respective one of said first and second supports such that each of said first and second supports is positioned at an upward angle on said brackets;

a panel being coupled between each of said brackets, said panel having a forwardly facing surface;

a motion sensor being coupled to said forwardly facing surface of said panel wherein said motion sensor is configured to detect motion within a trigger distance of said panel; and a plurality of light emitters, each of said light emitters being coupled to said forwardly facing surface of said panel wherein each of said light emitters is configured to emit light outwardly therefrom, each of said light emitters being electrically coupled to said motion sensor, each of said light emitters being turned on when said motion sensor senses motion, each of said light emitters being electrically coupled to a power source.

* * * * *